United States Patent [19]
Islam

[11] Patent Number: 5,224,194
[45] Date of Patent: Jun. 29, 1993

[54] ALL-OPTICAL TIMING RESTORATION

[75] Inventor: Mohammed N. Islam, Hazlet, N.J.

[73] Assignee: AT&T Bell Laboratories, Murray Hill, N.J.

[21] Appl. No.: 679,389

[22] Filed: Apr. 2, 1991

[51] Int. Cl.$^5$ .............................................. G02B 6/16
[52] U.S. Cl. ................... 385/122; 341/137;
    341/138; 359/108; 359/109; 359/332; 385/123
[58] Field of Search .............. 341/137, 138; 359/107,
    359/108, 109, 326, 332; 385/1, 27, 122, 123

[56] References Cited
U.S. PATENT DOCUMENTS

| | | | |
|---|---|---|---|
| 4,881,788 | 11/1989 | Doran | 359/108 X |
| 4,932,739 | 6/1990 | Islam | 359/108 |
| 5,020,050 | 5/1991 | Islam | 359/108 |
| 5,078,464 | 1/1992 | Islam | 385/122 |
| 5,115,488 | 5/1992 | Islam et al. | 385/127 |

OTHER PUBLICATIONS

"Chirp Mechanisms in Soliton–Dragging Logic Gates" M. N. Islam et al. *Optic Letters* vol. 16, No. 4, Feb. 15, 1991, pp. 214–216.

*Primary Examiner*—Frank Gonzalez
*Attorney, Agent, or Firm*—B. H. Freedman

[57] ABSTRACT

Timing restoration for a series of input pulses is performed optically in a transmission or switching system, using a nonlinear material with negligible walk-off that also receives an essentially orthogonally polarized series of reference pulses. In the nonlinear material, the input pulses are frequency shifted by the presence of the reference pulses. For a material with negligible walk-off, the frequency shift only occurs when the pulses partially overlap, but not when the pulses are coincident. The frequency shifted output from the nonlinear material is supplied to a dispersive delay line that translates the frequency shift into a time shift, such that the input pulses are retimed by the reference pulses. If the nonlinear material has a nonlinear index of refraction $n_2 > 0$, then the dispersive delay line must have an anomalous Group Velocity Dispersion (GVD); on the other hand, if the nonlinear material has an index of refraction $n_2 < 0$, then the dispersive delay line must have a normal GVD. The nonlinear and dispersive media may be separate sections or distributed in the same medium.

22 Claims, 5 Drawing Sheets

ALL-OPTICAL TIMING RESTORATION

BACKGROUND OF THE INVENTION

In optical switching and transmission systems, it is important to periodically restore the logic level and timing of pulses traveling in the optical transmission medium. Such restoration is currently performed in regenerators, which typically include electro-optical devices. The current trend toward all optical systems has resulted in development of erbium-doped fiber amplifiers, which when used with soliton pulses, correct the pulse amplitude and shape and thus provide logic level restoration without the need for optical to electrical conversion. When such amplifiers are used, timing restoration is still needed since without such restoration the transmission or switching system can become limited by timing jitter and fluctuations (e.g. from background spontaneous emission, temperature variations, etc.). To date, an optical device for performing such restoration has not been available. However, other advances in soliton transmission and switching systems, such as the ultra-fast optical logic devices, described in U.S. Pat. No. 4,932,739 issued to applicant on Jun. 12, 1990, and all-optical time domain chirp switch described in U.S. Pat. No. 5,078,464 issued to applicant on Jan. 7, 1992, and assigned to the same assignee as the present application, are available for use in helping to address the problem described above.

SUMMARY OF THE INVENTION

In accordance with the present invention, timing restoration for a sequence or series of input pulses is performed optically in a transmission or switching system, using a nonlinear material with negligible walk-off that also receives an essentially orthogonally polarized sequence or series of reference pulses. In the nonlinear material, the input pulses are frequency shifted by the presence of the reference pulses. For a material with negligible walk-off, the frequency shift only occurs when the pulses partially overlap, but not when the pulses are coincident. The frequency shifted output from the nonlinear material is supplied to a dispersive delay line that translates the frequency shift into a time shift, such that the input pulses are retimed by the reference pulses. If the nonlinear material has a nonlinear index of refraction $n_2 > 0$, then the dispersive delay line must have an anomalous Group Velocity Dispersion (GVD); on the other hand, if the nonlinear material has an index of refraction $n_2 < 0$, then the dispersive delay line must have a normal GVD. The nonlinear and dispersive media may be separate sections or may be distributed in the same medium.

In one embodiment, the invention can be realized by a hybrid time domain chirp switch (TDCS) similar to the one described in our above-cited patent application, that consists of a nonlinear chirper (which may be implemented in a semiconductor waveguide) followed by a dispersive delay line (which may be implemented in a polarization maintaining fiber). The chirp switch described in the above-cited patent application is modified, however, by arranging the nonlinear chirper (semiconductor waveguide) so that it exhibits negligible walk-off.

Another all-fiber embodiment of the nonlinear chirper may be a polarization holding fiber in the anomalous GVD regime that is made to look "non-birefringent". This can be accomplished by taking several segments of polarization maintaining fiber, exchanging the fast and slow axes alternately, and then splicing the segments together. To avoid walk-off, each segment should be less than half a walk-off length.

Using a timing restorer in accordance with our invention, an all-optical regenerator for solitons can be achieved by cascading our invention (e.g., a hybrid TDCS) with an optical amplifier such as an erbium-doped fiber amplifier. The regenerator advantageously will thus provide restoration of the amplitude, pulse shape, and timing.

BRIEF DESCRIPTION OF THE DRAWINGS

The present invention will be better understood by reference to the following Detailed Description, which should be read in light of the accompanying drawings in which.

DETAILED DESCRIPTION

Figure 1:
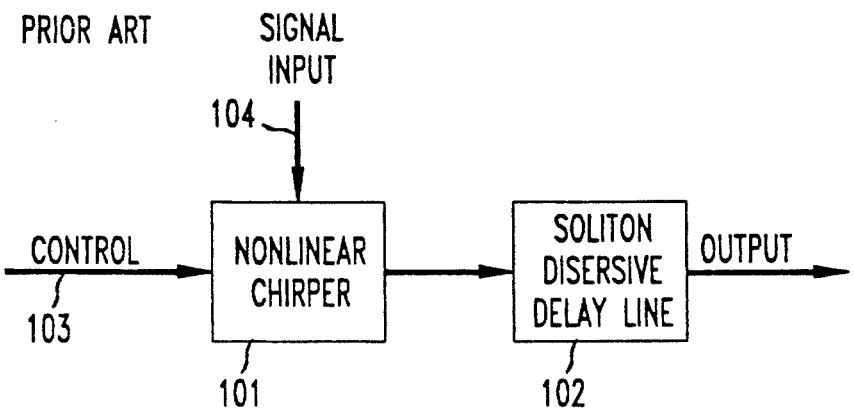
FIG. 1 is a schematic of a Time Domain Chirp Switch (TDCS), the details of which are described in the above-cited U.S. Pat. No. 5,078,464.
Figure 2:
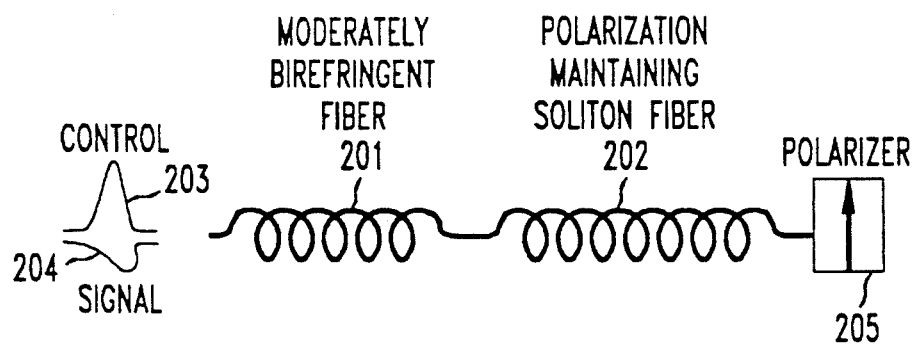
FIG. 2 illustrates one implementation of the TDCS of FIG. 1.

The above-cited copending application describes a time domain chirp switch (TDCS) logic gate shown in FIG. 1 that is based on soliton dragging in optical fibers. The switch, which has been implemented with switching energies approaching one picojoule, consists of a nonlinear chirper 101 followed by a soliton dispersive delay line 102. The digital logic that can be implemented by the switch of FIG. 1 is based on time shift keying in which a logical one corresponds to a control pulse applied on input 103 that arrives within a clock window as compared to an essentially orthogonally polarized signal pulse that is applied on input 104, and a logical zero corresponds to a control pulse that arrives outside of the clock window. One embodiment of the TDCS, illustrated in FIG. 2, includes a moderately birefringent fiber 201 that corresponds to nonlinear chirper 101 of FIG. 1, and a polarization maintaining fiber 202 coupled to a polarizer 205 that corresponds to soliton dispersive delay line 102 of FIG. 1. The control pulses 203 and signal pulses 204 applied to the TDCS are orthogonally polarized to avoid linear interference between the pulses. Only control pulses are passed through polarizer 205 and appear at control output 103 in FIG. 1.

Figure 3:
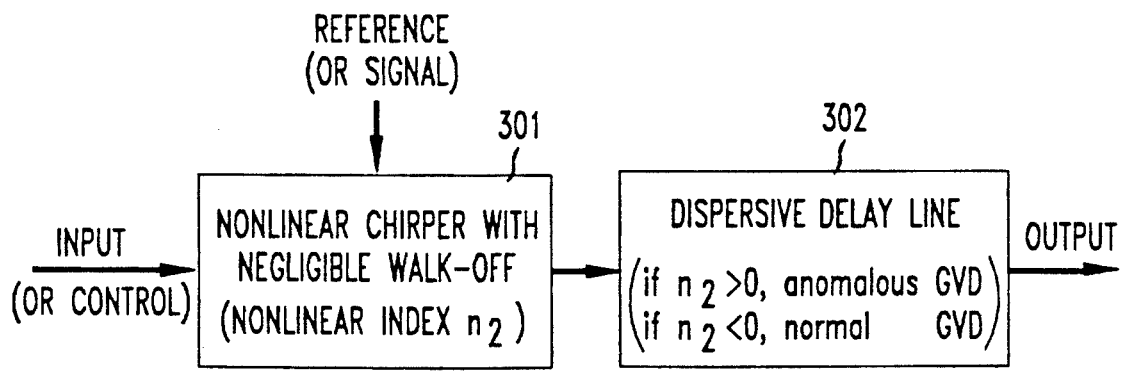
FIG. 3 illustrates in block diagram form, the elements of the present invention.

In accordance with the present invention, the TDCS of FIG. 1 is modified to yield a "hybrid" TDCS as shown in FIG. 3 by replacing nonlinear chirper 101 with a nonlinear chirper 301 having negligible walk-off. By this, we mean that the orthogonally polarized control and signal pulses have the same velocity, and, therefore, maintain their relative positions while propagating through the nonlinear material. In the nonlinear chirper, the control or input pulse is frequency shifted (or "chirped") by the presence of the reference or signal pulse. For a material with negligible walk-off, the frequency shift only occurs when the pulses partially overlap, but not when the pulses are coincident. The output of chirper 301 is coupled to dispersive delay line 302. that exhibits anomalous GVD if $n_2>0$, and that exhibits normal GVD if $n_2<0$. The GVD in dispersive delay line 302 translates the frequency shift provided by chirper 301 into a time shift. By arranging for the previously mentioned $n_2$ and GVD combinations, the desired timing restoration or correction is obtained. Dispersive delay line 302 may be a fiber or bulk optical elements such as gratings or prisms, provided that in all events, this component is arranged such that the pulse shape and width are not appreciably distorted. For example, if dispersive delay line 302 is implemented as a long length of optical fiber, it may be desirable to use soliton pulses rather than linear pulses.

Figure 4:
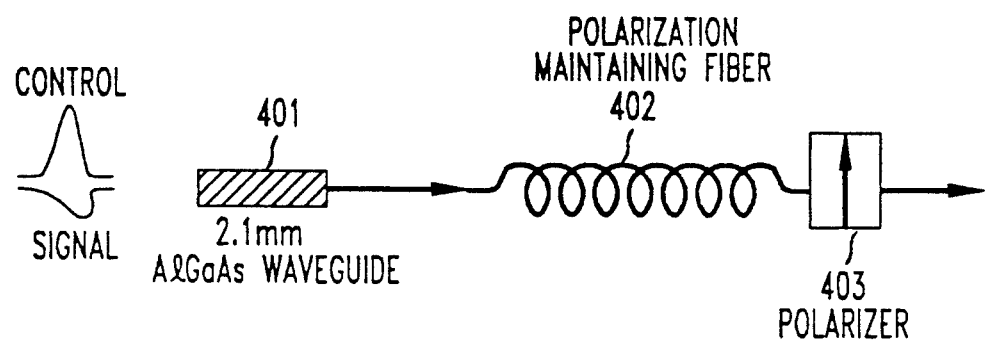
FIG. 4 illustrates one embodiment of the present invention that utilizes a hybrid TDCS comprising a semiconductor waveguide and a polarization maintaining fiber.

FIG. 4 illustrates one embodiment of the hybrid TDCS timing restorer of FIG. 3 in which nonlinear chirper with negligible walk-off 301 of FIG. 3 is implemented by an AlGaAs semiconductor waveguide 401 (described in more detail below) and in which soliton dispersive delay line 302 (as in FIG. 2) is implemented by polarization maintaining fiber 402 coupled to a polarizer 403 that only passes control pulses. The GVD of fiber 402 is arranged as indicated in FIG. 3.

The hybrid TDCS shown in FIG. 4 was tested in experimental apparatus that included a passively mode-locked color center laser that supplies $\tau \sim 415$ fsec pulses near 1.69 μm. Delay line 302 was implemented as 600 m of polarization maintaining, dispersion-shifted fiber 402 with a zero dispersion wavelength of 1.585 μm (group velocity dispersion at 1.69 μm is about 6 ps/(nm-km)). Waveguide 401 was 2.1 mm long and had a cross-sectional area of approximately 2.5 μm × 5 μm. It was formed as a ridge waveguide in a 2.55 μm thick layer of $Al_{0.2}Ga_{0.8}As$; guiding was assured by a 2.55 μm buffer layer of $Al_{0.5}Ga_{0.5}As$ that had a refractive index 0.15 less than the active layer. A large waveguide was chosen for ease of coupling using bulk optics, and, although several spatial modes were supported, the fiber afterwards acted as a spatial filter to favor the lowest order mode. The semiconductor material composition was chosen so that the laser spectrum lies more than 100 meV below the half-gap energy, thus avoiding two photon absorption. In this wavelength range it was found that $n_2 \sim 3 \times 10^{-14} cm^2/W$ and that the material is isotropic (e.g. cross-phase modulation is two-thirds of self-phase modulation). In this experiment a $\pi$-phase shift from self-phase modulation with less than a ten percent absorption was obtained, and it was found that the nonlinear absorption originated primarily from three photon absorption. Furthermore, time resolved pump-probe measurements confirmed that the nonlinearity was instantaneous on the 500 fs time scale of the pulses.

Figure 5:
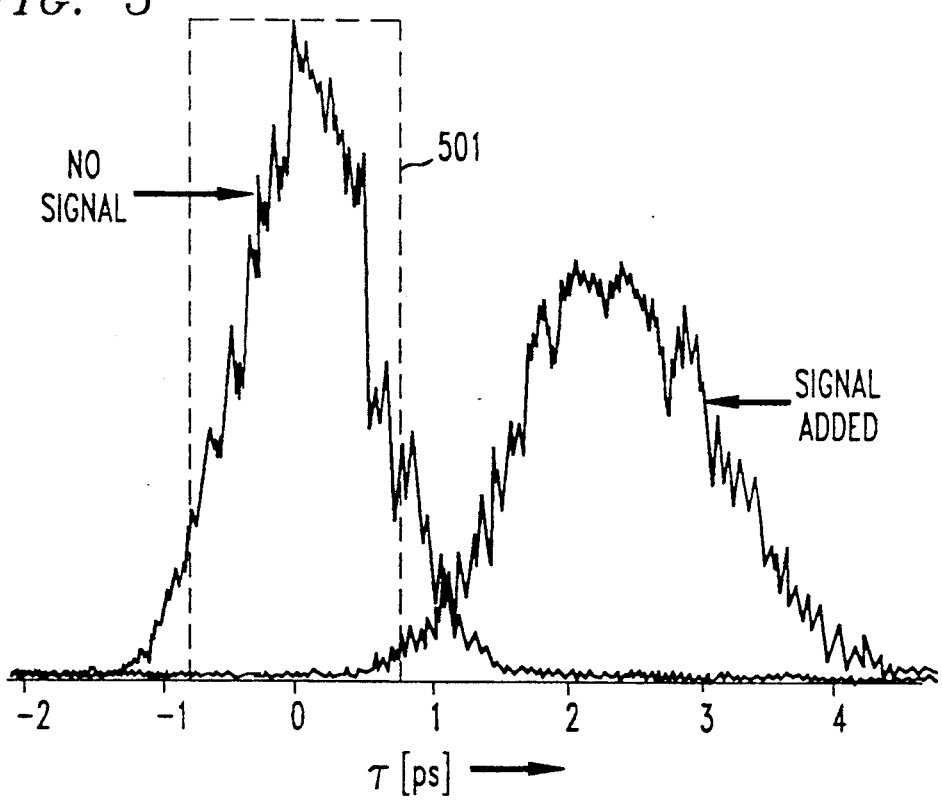
FIG. 5 illustrates time shift keyed data for the hybrid TDCS of FIG. 4, with a switching energy of 9.8 pJ and a fan-out of three.
Figure 6:
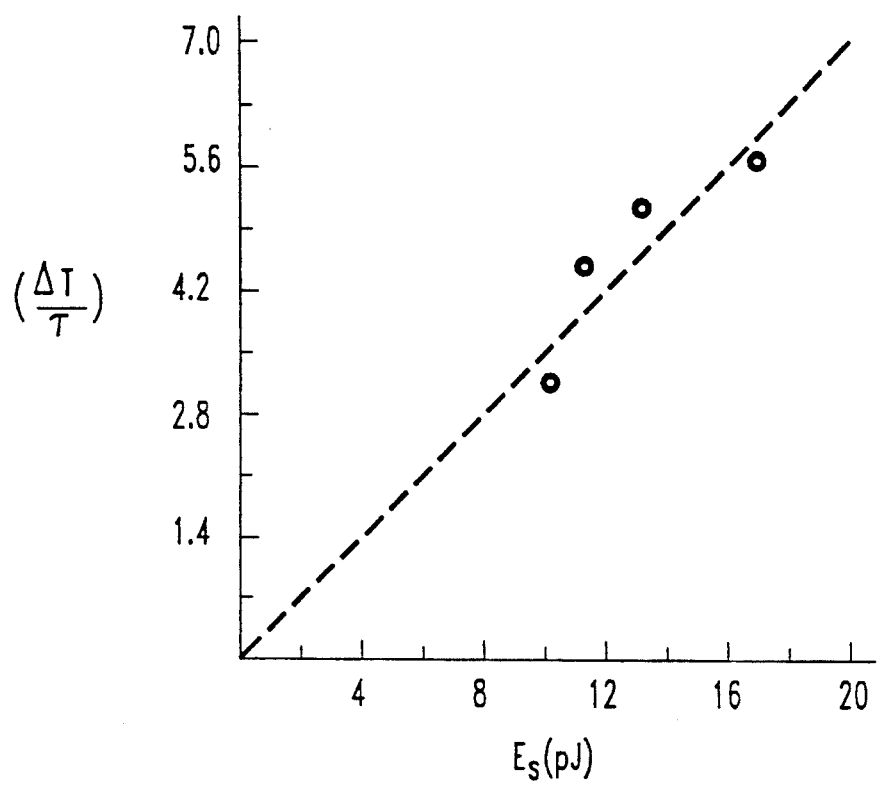
FIG. 6 illustrates shift of the control pulse versus the signal energy for a control energy of 96.5 pJ in the waveguide of FIG. 4.

The time shift keyed data for the hybrid TDCS of FIG. 4 is illustrated in FIG. 5, where the signal energy in the waveguide is 9.8 pJ and the control energy is 96.5 pJ. Rectangle 501 outlines the clock window, and it is noted that adding the signal shifts the control pulse out of this window. Because of mode mismatch and poor coupling into the fiber, the control energy exiting the fiber is 30.2 pJ, yielding a device fan-out or gain of about 3. Nonlinear phase shifts based on earlier nonlinear spectroscopy in longer lengths of the same waveguide were estimated. The peak self-phase-modulation phase shift for the control pulse in the waveguide was found to be about $\pi/3$, while the peak cross-phase-modulation phase shift imposed on the control by the signal was about $\pi/40$. The measured shift of the control pulse as a function of signal energy is illustrated in FIG. 6, and to the lowest order, it is expected that the shift will be linearly proportional to the switching energy.

Figure 7:
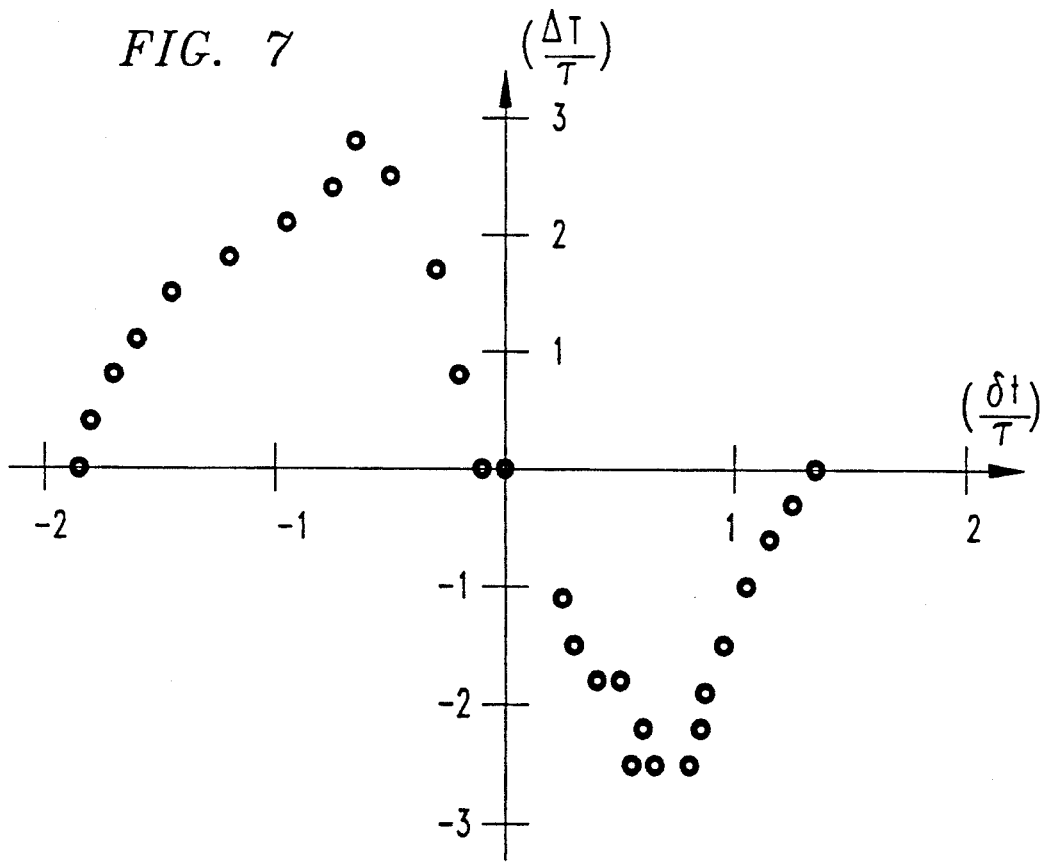
FIG. 7 illustrates the shift of the control pulse versus the initial separation between the control and signal pulses for the hybrid TDCS of FIG. 4.

It has been shown by M. N. Islam, C. R. Menyuk, C. J. Chen and C. E. Soccolich, Opt. Lett. 16, 214 (1991), that in soliton dragging, the control pulse chirps because of the combined action of cross-phase modulation and walk-off: the walk-off asymmetrizes the frequency modulation, thereby leading to a shift in the center frequency of the pulse. However, time-resolved measurements in waveguides as long as 7.7 mm indicate negligible walk-off for the 415 fs pulses used in the experiments. To understand how the present invention achieves time shift without birefringence, (i.e., using a semiconductive waveguide 401 as shown in FIG. 4) the shift of the control pulse $\Delta T$ as a function of the separation between the control and signal pulses $\delta t$, was studied experimentally, as shown in FIG. 7. Note in that figure that the results showed that there is not time shift when the two pulses are prefectly overlapped. On the other hand, when the pulses are partially separated and one pulse travels on the wing or side of the other pulse, there can be a net chirp or shift of the center frequency. The finite duration of the shift in FIG. 7 confirms that the nonlinearity is instantaneous and follows the pulse envelope.

The data in FIG. 7 also shows that the hybrid TDCS can provide the timing restoration that is desired. For example, suppose that the control pulse is the input pulse and that the signal pulse is a "reference" pulse with the proper temporal position. We define the separation between the pulses $\delta t = t_{input} - t_{ref}$ and the shift of the input pulse $\Delta T$. Therefore, if the input pulse is earlier than the reference pulse ($\delta t < 0$), then the nonlinear interaction pulls the input pulse to later times ($\Delta T > 0$), and vice versa. To precisely correct for timing errors, the reference pulse level can be adjusted so the slope of the timing curve near $\delta t \sim 0$ is unity.

An intuitive picture of the timing correction results from considering the frequency shift and anomalous group velocity dispersion. The instantaneous frequency change $\delta \omega$ of the input pulse is given by R. H. Stolen and Chinlon Lin, Phys. Rev. A. 17, 1448 (1978), as follows:

$$\delta\omega(t) = -\frac{\partial\Delta\Phi}{\partial t} = -\frac{2\pi}{\lambda}\frac{2}{3}n_2L\frac{\partial I_{ref}}{\partial t} \quad (1)$$

and is proportional to the negative slope of the reference pulse for $n_2 > 0$. Higher frequencies travel faster in anomalous GVD material, or a pulse with increased frequency arrives earlier and travels toward the left on a time axis.

Figure 8:
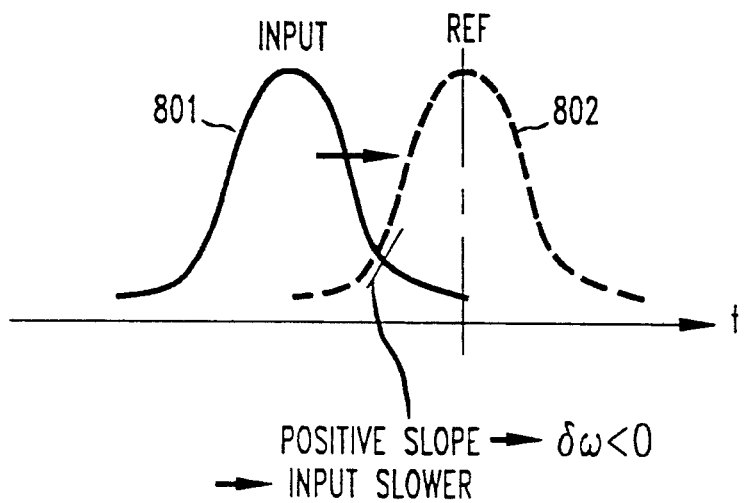
FIGS. 8 and 9 illustrate the temporal correcting nature of the nonlinear interaction for $n_2 > 0$ and anomalous group velocity dispersion in the embodiment of FIG. 4.
Figure 9:
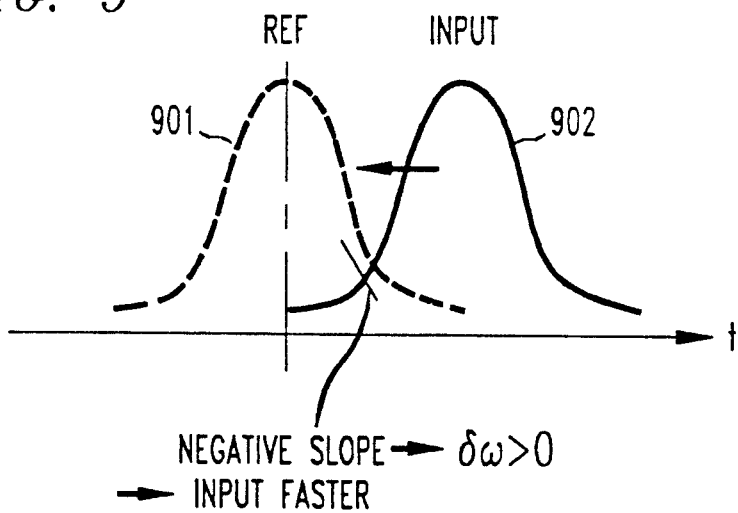

FIGS. 8 and 9 illustrate the correcting nature of the interaction. When the input pulse 801 arrives earlier than the reference pulse 802, input pulse 801 sees a positive slope, which lowers its instantaneous frequency, which in turn slows pulse 801 and moves it to a later time. When the input pulse 902 arrives later than the reference pulse 901, input pulse 902 sees a negative slope, which raises its instantaneous frequency, which in turn speeds up pulse 902 and moves it to an earlier time. Note that proper operation requires $n_2 > 0$ and anomalous dispersion in the fiber, or vice versa signs, and this simple picture holds as long as there is negligible walk-off between the two pulses. The preceding description is general, and is not limited to specific pulses; solitons may be desirable, but are not necessary.

Simple formulas describe the shift of the input pulse center frequency $\Delta\omega_c$ due to cross-phase-modulation in the limit of negligible dispersion, (no dispersion means that the pulses do not change in shape during the interaction). Standard soliton normalizations described by Mollenauer et al. in IEEE J. Quantum Electron, QE-22, 157 (1986) are used in the following equations, and t is local time on the pulse while z is distance along the waveguide. The case with negligible walk-off is described below, while the case of moderate birefringence is treated in the above-cited article in Optics Letters, Volume 16.

In the following analysis it is assumed that the input u and reference v pulses are given by $$u(z=0,t) = \mathrm{sech}(t); |v(z,t)|^2 = A_s^2 \mathrm{sech}^2(\beta(t+\delta t)) \quad (2)$$

where $\delta t = t_{input} - t_{ref}$ and $\beta = \tau_{input}/\tau_{ref}$. The input pulse accumulates a nonlinear phase shift due to cross-phase-modulation and is proportional to $$u(z = L, t) \propto \mathrm{sech}(t)\exp(i\Delta\Phi(t)) \quad (3a)$$

where $$\Delta\Phi(t) = \tfrac{2}{3} A_s^2 L\, \mathrm{sech}^2(\beta(t + \delta t)). \quad (3b)$$

Ther is also a phase shift arising from self-phase-modulation, but for a symmetric pulse this only leads to a symmetric broadening of the spectrum without a shift in the center frequency.

The shift in the frequency centroid is given by $$\Delta\omega_c = i\int_{-\infty}^{\infty} dt\, u^* \cdot \frac{\partial u}{\partial t} \Big/ \int_{-\infty}^{\infty} dt |u|^2 \quad (4)$$

and note that $\Delta\omega_c = 0$ when $A_s = 0$. Introducing Eqs. (3) into (4) we obtain $$\Delta\omega_c = \tfrac{2}{3} A_s^2 L \cdot G(\beta, \delta t) \quad (5a)$$

where $$G(\beta, \delta t) = \beta\int_{-\infty}^{\infty} dt\, \mathrm{sech}^2(t)\mathrm{sech}^2(\beta(t + \delta t))\tanh(\beta(t + \delta t)). \quad (5b)$$

Figure 10:
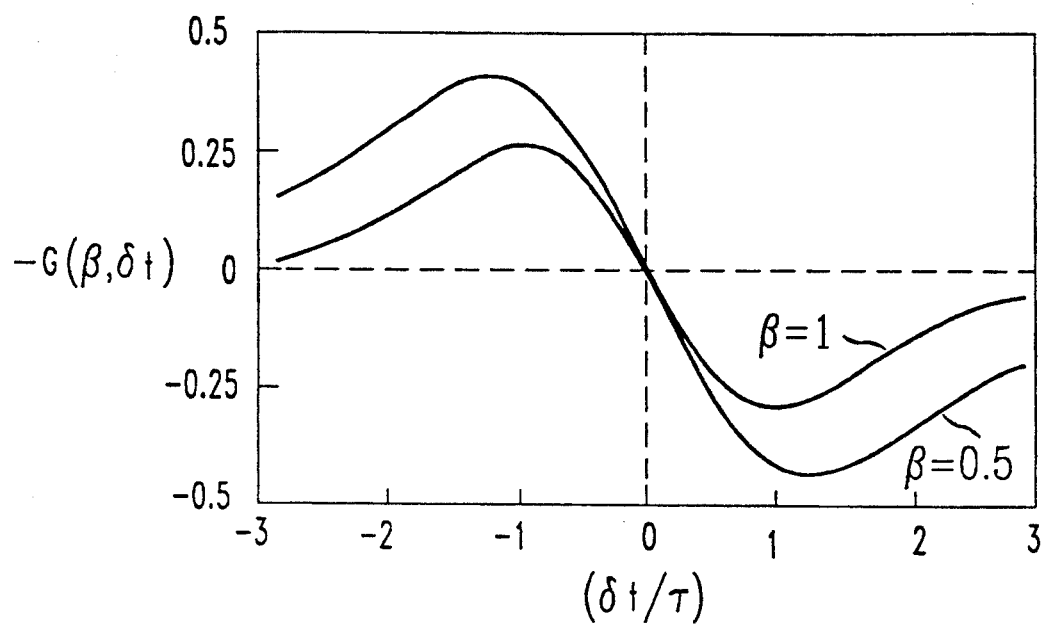
FIG. 10 illustrates for the embodiment of FIG. 4 the calculated frequency shift of an input pulse because of cross-phase-modulation, in which $\beta = 1$ corresponds to equal widths of the input and reference pulse, while $\beta = 0.5$ corresponds to a reference pulse twice as wide as the input.

It can be checked from symmetry arguments that $G(\delta t = 0) = 0$, as expected in the absence of walk-off. In FIG. 10, a plot illustrates the negative of $G(\beta, \delta t)$, which is proportional for anomalous GVD to $\Delta T/\tau$ of the input pulse, for different values of $\beta$, and it is found that there is qualitive agreement with the experimental data of FIG. 7. The experimental data may drop off more abruptly because the laser pulses are Gaussian rather than hyperbolic secant. The asymmetry in the experimental data may partially be due to slightly asymmetric pulses from the laser.

The timing restoration provided by the hybrid TDCS of FIG. 4 can be tailored by adjusting the characteristics of the reference pulse. The width of the timing window can be adjusted by changing the width of the reference pulse, and the slope of the correction can be adjusted by changing the intensity of the reference pulse. For example, as shown in FIG. 10, by doubling the pulse width of the reference, the timing correction window can be increased from $1.8\tau$ ($\beta = 1$) to $2.4\tau$ ($\beta = 0.5$).

Figure 11:
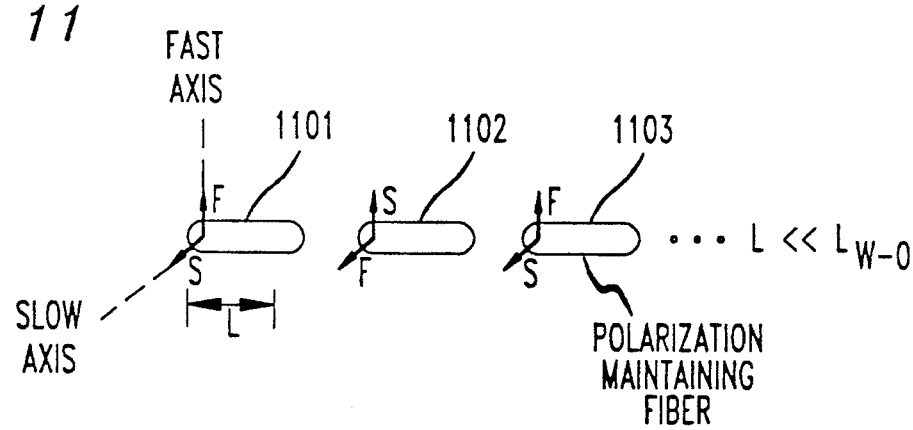
FIG. 11 illustrates another, all-fiber embodiment of a nonlinear chirper which can be used in a timing restorer in accordance with the present invention.

Although experiments were carried out with 415 fs pulses, the present invention can be extended to different pulse widths as well as to other nonlinear materials with negligible walk-off. For example, as shown in FIG. 11, a "non-birefringent" fiber that can maintain polarization extinction could be used as nonlinear chirper 301 of FIG. 3. as the hybrid TDCS of FIG. 4. In this embodiment a number of optical fiber segments 1101, 1102, 1103 each having its slow and fast axes crossed, can be spliced together. In this arrangement, the length of each segment should be less than half of the walk-off length. Since optical fibers have $n_2 > 0$, the device should be operated in the anomalous GVD regime.

Figure 12:
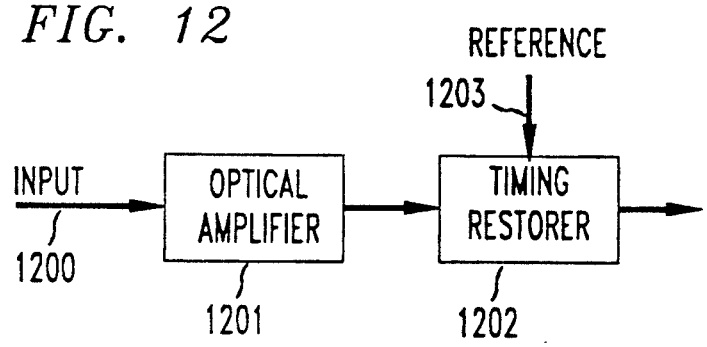
FIG. 12 illustrates in block diagram form the use of a timing restorer such as the restorer of FIGS. 3, 4 or 11, in an all-optical regenerator.

The use of a timing restorer in accordance with the present invention in an all optical pulse regenerator, is illustrated in FIG. 12. As shown, a stream or series of soliton pulses on input 1200 are applied to an optical amplifier 1201, which may be anerbium-doped fiber amplifier, in order to restore the amplitude and shape of the pulses. Thereafter, the pulses are applied to a timing restorer 1202, which receives a stream or series of reference pulses on input 1203. Restorer 1202, which may be implemented as shown generally in FIG. 3, and specifically as shown in FIGS. 4 or 11, restores the input pulses on line 1200 to the timing provided by the reference pulses. The regenerator of FIG. 12 is all optical, and does not require elecro-optical components.

Numerous modifications and improvements can be made to the present invention, as will be understood by those skilled in the art. For example, by increasing the nonlinearity $n_2$, less reference pulse energy is required, or by modifying the temporal profile of the reference pulse, one can tailor the shape of the time window. Accordingly, it is to be understood that the invention is to be limited only by the appended claims.

I claim:

1. Apparatus in an optical communications system for restoring the timing in a series of input pulses in accordance with a series of reference pulses, said apparatus comprising a nonlinear material having negligible walk-off and having a nonlinear index of refraction $n_2$ for receiving said input pulses with a first polarization orientation and said reference pulses with a second polarization orientation essentially orthogonal to said first polarization orientation; and a dispersive delay line for receiving pulses output from said nonlinear material, said delay line having anomalous Group Velocity Dispersion (GVD) if $n_2$ is greater than 0 and normal GVD if $n_2$ is less than 0.

2. The invention defined in claim 1 wherein said nonlinear material comprises a plurality of connected segments of polarization maintaining fiber having a nonlinear index of refraction $n_2$, each of said segments having a fast axis and a slow axis, said segments being connected such that said fast and slow axes of alternate segments are exchanged.

3. The invention defined in claim 2 wherein the length of each of said segments is less than half a walk-off length.

4. Apparatus for retiming a sequence of input pulses in an optical transmission medium in accordance with a reference sequence of pulses, comprising means for shifting the frequency of pulses in said input sequence of pulses due to the presence of said reference sequence of pulses, and means for advancing or retarding the pulses in said input sequence as a function of said pulse frequency.

5. The invention defined in claim 4, wherein said frequency shifting means includes a nonlinear material with negligible walk-off, and wherein said advancing or retarding means includes a dispersive delay line.

6. The invention defined in claim 5, wherein said nonlinear material has a nonlinear index of refraction of $n_2$ and wherein said dispersive delay line has anomalous Group Velocity Dispersion (GVD) if $n_2$ is positive and normal GVD if $n_2$ is negative.

7. Apparatus in an optical communications system for altering the timing in a series of input pulses in accordance with a series of essentially orthogonally polarized reference pulses, including a nonlinear material receiving said input pulses and said series of essentially orthogonally polarized reference pulses, said nonlinear material arranged to shift the frequency of said input pulses as a result of the presence of said reference pulses in said material, and a dispersive delay line receiving said input and reference pulses, said delay line arranged to translate said frequency shift produced by said nonlinear material into a corresponding time shift.

8. The invention defined in claim 7 wherein said input and reference pulses are soliton pulses.

9. The invention defined in claim 8 wherein said nonlinear material is a semiconductor waveguide.

10. The invention defined in claim 9 wherein said semiconductor is comprised of AlGaAs.

11. The invention defined in claim 8 wherein said dispersive delay line is a polarization maintaining optical fiber.

12. In an optical communications system, a method of restoring the timing in a series of input pulses with a first polarization orientation in accordance with a series of reference pulses with a second polarization orientation orthogonal to said first polarization, said method comprising the steps of applying said input pulses and said reference pulses to a nonlinear material having negligible walk-off and having a nonlinear index of refraction $n_2$; and applying pulses output from said nonlinear material to a delay line having anomalous Group Velocity Dispersion (DVD) is $n_2$ is greater than 0 and normal GVD if $n_2$ is less than 0.

13. The method of claim 12 wherein said non-linear material includes a plurality of connected segments of polarization maintaining fiber having a nonlinear index of refraction $n_2$, each of said segments having a fast axis and a slow axis, said segments being connected such that fast and slow axes of alternate segments are exchanged.

14. The invention defined in claim 13 wherein the length of each of said segments is less than half a walk-off length.

15. A method of retiming a sequence of input pulses in an optical transmission medium in accordance with a reference sequence of pulses, comprising the steps of shifting the frequency of pulses in said input sequence of pulses due to the presence of said reference sequence of pulses, and advancing or retarding of pulses in said input sequence as a function of said pulse frequency.

16. The method defined in claim 15, wherein said frequency shifting step includes applying said pulses to a nonlinear material with negligible walk-off, and wherein said advancing or retarding step includes applying said pulses to a dispersive delay line.

17. The invention defined in claim 16, wherein said nonlinear material has a nonlinear index of refraction of $n_2$ and wherein said dispersive delay line has anomalous Group Velocity Dispersion (GVD) if $n_2$ is positive and normal GVD if $n_2$ is negative.

18. In an optical communications system, a method of altering the timing in a sequence of input pulses in accordance with a series of essentially orthogonally polarized reference pulses, including the steps of shifting the frequency of said input pulses as a result of the presence of a sequence of essentially orthogonally polarized reference pulses, by applying said input pulses and said reference pulses to a nonlinear material, and translating said frequency shift produced by said nonlinear material into a corresponding time shift by applying pulses output from said nonlinear material to a dispersive delay line.

19. The invention defined in claim 18 wherein said input and reference pulses are soliton pulses.

20. The invention defined in claim 18 wherein said nonlinear material is a semiconductor waveguide.

21. The invention defined in claim 20 wherein said semiconductor is comprised of AlGaAs.

22. The invention defined in claim 18 wherein said dispersive delay line is a polarization maintaining optical fiber.

* * * * *